US011625186B2

(12) United States Patent
Shah et al.

(10) Patent No.: US 11,625,186 B2
(45) Date of Patent: Apr. 11, 2023

(54) DATA ERASURE OF NETWORK DEVICES

(71) Applicant: Blancco Technology Group IP OY, Joensuu (FI)

(72) Inventors: Mitesh Shah, Maharashtra (IN); Markku Valtonen, Joensuu (FI); Dhia Ben Haddej, Joensuu (FI); Chandrashekhar Kakade, Maharashtra (IN); Akash Nehere, Maharashtra (IN); Prasad Bidkar, Maharashtra (IN); Pratibha Pathekar, Maharashtra (IN)

(73) Assignee: BLANCCO TECHNOLOGY GROUP IP OY, Joensun (FI)

( * ) Notice: Subject to any disclaimer, the term of this patent is extended or adjusted under 35 U.S.C. 154(b) by 0 days.

(21) Appl. No.: 17/375,291

(22) Filed: Jul. 14, 2021

(65) Prior Publication Data
US 2022/0019369 A1    Jan. 20, 2022

(30) Foreign Application Priority Data

Jul. 16, 2020 (IN) .............................. 202011030413

(51) Int. Cl.
*G06F 3/06* (2006.01)
(52) U.S. Cl.
CPC .......... *G06F 3/0652* (2013.01); *G06F 3/0604* (2013.01); *G06F 3/067* (2013.01);
(Continued)
(58) Field of Classification Search
CPC .... G06F 3/0604; G06F 3/0622; G06F 3/0623; G06F 3/0652; G06F 3/0659; G06F 3/067;
(Continued)

(56) References Cited

U.S. PATENT DOCUMENTS

| 2014/0052976 | A1* | 2/2014 | Marino ................. G06F 3/0655 713/2 |
| 2016/0004648 | A1 | 1/2016 | Mukouchi |

(Continued)

FOREIGN PATENT DOCUMENTS

WO    2020117903    6/2020

OTHER PUBLICATIONS

Kissel et al., NIST Special Publication 800-88 Revision 1, "Guidelines for Media Sanitization", Dec. 2014, pp. 24-25. (Year: 2014).*

(Continued)

*Primary Examiner* — Than Nguyen
(74) *Attorney, Agent, or Firm* — Dickinson Wright PLLC

(57) ABSTRACT

A method for erasing stored data from the memory of the network device and requesting data from the memory after completion of the data erasure procedure or accessing the memory of the network device after completion of the data erasure procedure. The method further comprises determining the outcome of the data erasure procedure based on: the results of a comparison between a response received from the network device in reply to the request for data and an expected response which is indicative of a successful erasure of the memory of the network device; or the results of a comparison between any contents of the memory of the network device after completion of the data erasure procedure and expected contents of the memory of the network device after completion of the data erasure procedure which are indicative of a successful erasure of the memory of the network device.

20 Claims, 8 Drawing Sheets

(52) U.S. Cl.
CPC .......... *G06F 3/0622* (2013.01); *G06F 3/0623* (2013.01); *G06F 3/0659* (2013.01)

(58) Field of Classification Search
CPC .. G06F 3/0673; G06F 3/0679; G06F 12/0246; G06F 2212/7205
USPC .......................................... 711/103, 154, 166
See application file for complete search history.

(56) References Cited

U.S. PATENT DOCUMENTS

2019/0095126 A1* 3/2019 Törmä .................. G06F 3/0652
2019/0369902 A1 12/2019 Awan et al.
2020/0074068 A1 3/2020 Fix et al.

OTHER PUBLICATIONS

Notification of Transmittal of the International Search Report and the Written Opinion of the International Searching Authority, or the Declaration dated Oct. 6, 2021 (dated Oct. 6, 2021) on related international application PCT/EP2021/069725 issued by the European Patent Office / International Searching Authority.

* cited by examiner

```
Switch#show ip arp
Switch#
```

FIG. 5A

```
Switch#
Switch#show ip arp
Protocol    Address              Age (min)    Hardward Addr.    Type      Interface
Internet    10.1.169.12              -        acf2.c570.9fbf    ARPA      Vlan1
Switch#
```

FIG. 5B

```
Switch#show startup-config
Using 9 out of 524284 bytes, uncompressed size = 5 bytes
end Switch#
```

FIG. 6A

```
Switch# show startup-config
Using 975 out of 524284 bytes, uncompressed size = 2467 bytes
Uncompressed configuration from 975 bytes to 2467 bytes
!
version 12.2
no service pad
service timestamps debug datetime msec
service timestamps log datetime msec
no service password-encryption
service compress-config
!
hostname Switch
!
boot-start-marker
boot-end-marker
!
!
!
!
no aaa new-model
ip subnet-zero
!
!
!
ip vrf mgmtVrf
!
!
!
!
power redundancy-mode redundant
!
```

FIG. 6B

```
Switch#dir nvram:
Directory of nvram:/

512    -rw-          9              <no date>  startup-config
513    ----          5              <no date>  private-config
514    -rw-          9              <no date>  underlying-config
  1    ----          0              <no date>  rf_cold_starts
  2    ----        103              <no date>  persistent-data 524284 bytes total (522170 bytes free)
Switch#
```

FIG. 7A

```
Switch#dir nvram:
Directory of nvram:/

512    -rw-        975              <no date>  startup-config
513    ----          5              <no date>  private-config
514    -rw-        975              <no date>  underlying-config
  1    ----          0              <no date>  rf_cold_starts
  2    ----        103              <no date>  persistent-data
  3    -rw-          0              <no date>  ifIndex-table.gz
  4    -rw-       1659              <no date>  1.txt
  6    -rw-       1659              <no date>  2.txt
  8    -rw-       1659              <no date>  3.txt
 10    -rw-       1659              <no date>  4.txt
 12    -rw-       1659              <no date>  5.txt
 14    -rw-       1659              <no date>  6.txt
 16    -rw-       1659              <no date>  7.txt
 18    -rw-       1659              <no date>  9.txt
 20    -rw-       1659              <no date>  10.txt
 22    -rw-       1659              <no date>  12.txt 524284 bytes total (499700 bytes free)
Switch#
```

FIG. 7B

DATA ERASURE OF NETWORK DEVICES

CROSS REFERENCE TO RELATED APPLICATIONS

This application claims priority to Indian Patent Application No. 202011030413, filed on Jul. 16, 2020 and entitled "Data Erasure of Network Devices," the disclosure of which is incorporated by reference in its entirety.

FIELD

The present disclosure relates to a method and a system for use in erasing data stored in the memory of a network device and, in particular though not exclusively, to a method and a system for use in erasing data stored in the memory of at least one of a router, a switch, a modem, a gateway, a firewall, a media converter, and a repeater.

BACKGROUND

Information networks, such as the public Internet and Local Area Networks (LANs), comprise computers connected to each other via network devices, for example routers, switches, modems, gateways, firewalls, media converters and repeaters. These network devices store data which may cause an information security risk by providing access to the network itself and/or access to log information of the network traffic (e.g. accessed websites).

In IP networks, data packets are forwarded from one network device to another. Specifically, the Internet Protocol (IP) enables delivering packets from a source computing resource or host to a destination computing resource or host based on the IP addresses in headers of the data packets. On interconnected networks, routers transport packets across network boundaries based on information the routers store in their internal routing tables.

Further, routers typically collect and log data on the devices and traffic on the network. Such data may include, for example, the number of devices connected to the router, device IP addresses, MAC addresses and serial numbers, and data on network traffic, such as visited websites. Such data may be used for network optimisation or targeted advertisement by an Internet Service Provider (ISP). However, such data could also be used by hackers trying to find and target vulnerable devices on the network or sensitive information related to the visited websites.

Access to a local network is typically protected by a password stored in a router or a firewall. While these network devices are typically protected by passwords themselves, the default username and password of network devices are typically very generic (e.g. "admin"/"1234") and may be inscribed on the outside of the network device by the Original Equipment Manufacturer (OEM) of the network device. In case the default password is unchanged, it would be easy for anyone with access to the physical network device to view the network password, rules, and log data. Even without knowing the network password, at least some of the data may be accessible by using invasive methods to read the memory of the network device directly, thus bypassing the firmware layer.

In view of the foregoing, there is a need to be able to reliably erase the memory of network devices after they have been used in a network. However, the vast range of network devices and manufacturers, as well as the lack of universal standards for network device data management, pose a challenge. Currently, there is no universal method for erasing network devices.

Some OEMs use a proprietary set of commands/methods to trigger an internal erase function in which case the user has to maintain documentation to describe the interfaces and commands to erase different devices. While there are some universal remote management protocols, these protocols may only include optional methods on data management, and allow for different interpretations and partial implementations. For example, support for FactoryReset Remote Procedure Call (RPC) message is only an optional part of the TR-069 CPE WAN Management Protocol (Issue: 1 Amendment 6).

SUMMARY

According to an aspect of the present disclosure there is provided a method for use in erasing data stored in the memory of a network device, the method comprising:

performing a data erasure procedure to erase the stored data from the memory of the network device;

requesting data from the memory of the network device after completion of the data erasure procedure or accessing the memory of the network device after completion of the data erasure procedure; and determining the outcome of the data erasure procedure based at least in part on:

the results of a comparison between a response received from the network device in reply to the request for data and an expected response which is indicative of a successful erasure of the memory of the network device; or the results of a comparison between any contents of the memory of the network device after completion of the data erasure procedure and expected contents of the memory of the network device after completion of the data erasure procedure which are indicative of a successful erasure of the memory of the network device.

Determining the outcome of the data erasure procedure may enable the provision of an audit trail, for example to allow a third party to verify successful erasure of the network device on demand at a later date.

The method may comprise recording or storing the received response, for example recording or storing the received response in the Cloud. Recording or storing the received response may provide an audit trail, for example to allow a third party to verify successful erasure of the network device on demand at a later date.

The method may comprise recording or storing any contents of the memory of the network device after completion of the data erasure procedure, for example recording or storing any contents of the memory of the network device after completion of the data erasure procedure in the Cloud. Recording or storing any contents of the memory of the network device after completion of the data erasure procedure may provide an audit trail, for example to allow a third party to verify successful erasure of the network device on demand at a later date.

The method may comprise recording or storing the determined outcome of the data erasure procedure, for example recording or storing the determined outcome of the data erasure procedure in the Cloud. Recording or storing the determined outcome of the data erasure procedure may provide an audit trail, for example to allow a third party to verify successful erasure of the network device on demand at a later date.

The expected response may comprise a default response.

The expected contents of the memory of the network device may comprise default contents.

The method may comprise requesting IP address data from the memory of the network device after completion of the data erasure procedure. The method may comprise determining a successful outcome based at least in part on verifying that the received response from the network device does not include any IP address data assigned to the network device.

The method may comprise accessing a pre-defined portion of the memory of the network device used to store IP address data after completion of the data erasure procedure. The method may comprise determining a successful outcome based at least in part on verifying that the pre-defined portion of the memory of the network device used to store IP address data does not include any IP address data after completion of the data erasure procedure.

The method may comprise requesting MAC address data from the memory of the network device after completion of the data erasure procedure. The method may comprise determining a successful outcome based at least in part on verifying that the received response from the network device does not include any MAC address data assigned to the network device.

The method may comprise accessing a pre-defined portion of the memory of the network device used to store MAC address data after completion of the data erasure procedure. The method may comprise determining a successful outcome based at least in part on verifying that the pre-defined portion of the memory of the network device used to store MAC address data does not include any MAC address data after completion of the data erasure procedure.

The method may comprise requesting running configuration data from the memory of the network device after completion of the data erasure procedure. The method may comprise determining a successful outcome based at least in part on verifying that the received response from the network device corresponds to an expected running configuration which is indicative of a successful erasure of the memory of the network device.

The method may comprise accessing a pre-defined portion of the memory of the network device used to store running configuration data after completion of the data erasure procedure. The method may comprise determining a successful outcome based at least in part on verifying that the pre-defined portion of the memory of the network device used to store running configuration data includes running configuration data that corresponds to an expected running configuration which is indicative of a successful erasure of the memory of the network device.

The method may comprise requesting a name and a password of a local area network (LAN) from the memory of the network device after completion of the data erasure procedure. The method may comprise determining a successful outcome based at least in part on verifying that the received name and password of the local area network correspond to an expected username and an expected password of the local area network respectively.

The method may comprise accessing a pre-defined portion of the memory of the network device that is used to store a name and a password of a local area network (LAN) after completion of the data erasure procedure. The method may comprise verifying that a name and a password of the local area network (LAN) stored in the pre-defined portion of the memory of the network device that is used to store a name and a password of the local area network (LAN) after completion of the data erasure procedure correspond to an expected name and an expected password of the local area network (LAN) respectively.

The method may comprise requesting network device information from the network device.

The method may comprise receiving network device information from the network device in reply to the request for network device information.

The method may comprise selecting the data erasure procedure from a database of data erasure procedures based at least in part on the received network device information.

The method may comprise selecting the expected response which is indicative of a successful erasure of the memory of the network device from a database of expected responses based at least in part on the received network device information.

The method may comprise accessing network device information stored in the memory of the network device.

The method may comprise selecting the data erasure procedure from a database of data erasure procedures based at least in part on the accessed network device information.

The method may comprise selecting the expected contents of the memory of the network device which are indicative of a successful erasure of the memory of the network device from a database of expected contents based at least in part on the accessed network device information.

The network device information may comprise at least one of a make, a model number of the network device, and/or details of an operating system of the network device such as a type and/or version of the operating system of the network device.

At least one of the database of data erasure procedures, the database of expected responses, and the database of expected contents comprises a profiler API.

The method may comprise requesting initial data from the memory of the network device before commencing the data erasure procedure.

The method may comprise receiving an initial response from the network device in reply to the request for initial data.

The method may comprise determining the outcome of the data erasure procedure based at least in part on the results of a comparison between an initial response received from the network device in reply to the request for initial data and the received response from the network device.

The method may comprise accessing the memory of the network device before commencing the data erasure procedure. The method may comprise determining the outcome of the data erasure procedure based at least in part on the results of a comparison between any initial contents of the memory of the network device before commencing the data erasure procedure and any contents of the memory of the network device after completion of the data erasure procedure.

The method may comprise determining that the outcome of the data erasure procedure is successful based at least in part on verifying that a routing table of the network device has been cleared of any IP addresses and/or cleared of any MAC addresses.

The stored data may comprise one or more IP addresses.

The stored data may comprise one or more MAC addresses.

The stored data may comprise one or more usernames.

The stored data may comprise one or more passwords.

The stored data may comprise a name of a local area network (LAN).

The stored data may comprise a password of the local area network (LAN).

The stored data may comprise configuration data such as IP config data and/or boot setting data.

The stored data may be stored in one or more data files and/or one or more configuration files in a file system in the memory of the network device.

The data erasure procedure may be configured to erase all accessible data stored in the memory of the network device.

Performing the data erasure procedure may comprise clearing data stored in the memory of the network device.

Performing the data erasure procedure may comprise replacing data stored in the memory of the network device.

Performing the data erasure procedure may comprise changing a key used to encrypt data stored in the memory of the network device.

The data erasure procedure may comprise a clear level sanitization as defined according to NIST SP 800-88 (Revision 1).

Performing the data erasure procedure may comprise executing an internal, built-in, default, factory and/or proprietary data erasure procedure associated with, or stored in, the network device, for example executing a reset procedure or an erase function associated with, or stored in, the network device.

Performing the data erasure procedure may comprise clearing the data stored in the memory of the network device manually, for example through a computing resource and/or a user interface.

The data erasure procedure may comprise a purge level sanitization as defined according to NIST SP 800-88 (Revision 1).

Performing the data erasure procedure may comprise updating and/or replacing software and/or firmware of the network device.

The network device may comprise a device which has a memory and which is configured to interconnect, or which enables the interconnection of, two or more computing resources.

The network device may comprise at least one of a router, a switch, a modem, a gateway, a firewall, a media converter, and a repeater.

The network device may comprise a router having a serial port.

The method may comprise logging in to the router by sending a username and password to the router via the serial port.

The method may comprise sending a trigger command to the router via the serial port to cause the router to initiate an internal, built-in, default, factory and/or proprietary data erasure procedure associated with, or stored in, the router, for example to cause the router to initiate a reset procedure or an erase function associated with, or stored in, the router.

The method may comprise providing the router with an image file. The method may comprise sending a trigger command to the router via the serial port to cause the router to use the image file to overwrite existing firmware of the router.

The method may comprise:

logging in to the router via the serial port after completion of the data erasure procedure;

requesting the data from the memory of the router via the serial port; and receiving the response from the router via the serial port in reply to the request for data.

Logging in to the router via the serial port after completion of the data erasure procedure may comprise:

using a default username and password to log in to the router; or re-setting the username and password.

The network device may have an Ethernet port for communication with a Wide Area Network (WAN).

The method may comprise establishing a connection with the network device via the Ethernet port according to a WAN Management Protocol. Establishing a connection with the network device via the Ethernet port according to a WAN Management Protocol may be advantageous because it avoids any requirement to log in to the network device, for example by sending a username and password to the network device.

The WAN Management Protocol may comprise a TR-069 CPE WAN Management Protocol (CWMP).

The method may comprise sending a FactoryReset Remote Procedure Call (RPC) message to the network device to reset the network device to its factory default state and cause the memory of the network device to be erased.

The method may comprise sending a ScheduleDownload or a Download message to the network device to cause the network device to download a firmware update from a designated location and to apply the firmware update in order to overwrite existing firmware of the network device.

According to an aspect of the present disclosure there is provided a system for use in erasing data stored in the memory of a network device, the system configured to perform any of the foregoing methods.

The system may comprise a computing resource configured for communication with the network device.

The computing resource may be configured to trigger or initiate the data erasure procedure or perform the data erasure procedure on the memory of the network device.

The computing resource may be configured to request data from the memory of the network device after completion of the data erasure procedure.

The computing resource may be configured to receive the response from the network device in reply to the request for data.

The computing resource may be configured to determine the outcome of the data erasure procedure based at least in part on the results of the comparison between the response received from the network device in reply to the request for data and the expected response which is indicative of the successful erasure of the memory of the network device.

The computing resource may be configured to access the memory of the network device after completion of the data erasure procedure.

The computing resource may be configured to determine the outcome of the data erasure procedure based at least in part on the results of a comparison between any contents of the memory of the network device after completion of the data erasure procedure and expected contents of the memory of the network device after completion of the data erasure procedure which are indicative of a successful erasure of the memory of the network device.

The computing resource may be configured to record or store the determined outcome of the data erasure procedure in a memory of the computing resource.

The computing resource may be configured to record or store the determined outcome of the data erasure procedure remotely from the computing resource, for example in the Cloud.

The computing resource may be configured to record or store the received response in a memory of the computing resource.

The computing resource may be configured to record or store the received response remotely from the computing resource, for example in the Cloud.

The computing resource may be configured to record or store any contents of the memory of the network device after completion of the data erasure procedure.

The computing resource may be configured to record or store any contents of the memory of the network device after completion of the data erasure procedure in the Cloud. The expected response may comprise a default response.

The expected contents of the memory of the network device may comprise default contents.

The computing resource may be configured to request network device information from the network device.

The computing resource may be configured to receive network device information from the network device in reply to the request for network device information.

The computing resource may be configured to select the data erasure procedure from a database of data erasure procedures based at least in part on the received network device information.

The computing resource may be configured to select the expected response from a database of expected responses or default responses based at least in part on the received network device information. The computing resource may be configured to access network device information stored in the memory of the network device.

The computing resource may be configured to select the data erasure procedure from a database of data erasure procedures based at least in part on the accessed network device information.

The computing resource may be configured to select the expected contents of the memory of the network device which are indicative of a successful erasure of the memory of the network device from a database of expected contents based at least in part on the accessed network device information.

The computing resource may be configured to access network device information stored in the memory of the network device.

The computing resource may be configured to select the data erasure procedure from a database of data erasure procedures based at least in part on the accessed network device information.

The computing resource may be configured to select the expected contents of the memory of the network device which are indicative of a successful erasure of the memory of the network device from a database of expected contents based at least in part on the accessed network device information.

At least one of the database of data erasure procedures, the database of expected responses, and the database of expected contents may comprise a profiler API.

At least one of the database of data erasure procedures, the database of expected responses, and the database of expected contents may be provided with the computing resource or remotely from the computing resource.

The network device information may comprise at least one of a make, a model number of the network device, and/or details of an operating system of the network device such as a type and/or version of the operating system of the network device.

The computing resource may be configured to request initial data from the memory of the network device before commencing the data erasure procedure.

The computing resource may be configured to receive an initial response from the network device in reply to the request for initial data.

The computing resource may be configured to determine the outcome of the data erasure procedure based at least in part on the results of a comparison between an initial response received from the network device in reply to the request for initial data and the received response from the network device.

The computing resource may be configured to access the memory of the network device before commencing the data erasure procedure.

The computing resource may be configured to determine the outcome of the data erasure procedure based at least in part on the results of a comparison between any initial contents of the memory of the network device before commencing the data erasure procedure and any contents of the memory of the network device after completion of the data erasure procedure.

The computing resource may be configured to determine that the outcome of the data erasure procedure is successful based at least in part on verifying that a routing table of the network device has been cleared of any IP addresses and/or cleared of any MAC addresses.

The stored data may comprise one or more IP addresses.

The stored data may comprise one or more MAC addresses.

The stored data may comprise one or more usernames.

The stored data may comprise one or more passwords.

The stored data may comprise a name of a local area network (LAN).

The stored data may comprise a password of the local area network (LAN).

The stored data may comprise configuration data such as IP config data and/or boot setting data.

The stored data may be stored in one or more data files and/or one or more configuration files in a file system in the memory of the network device.

The data erasure procedure may be configured to erase all accessible data stored in the memory of the network device.

The data erasure procedure may comprise clearing data stored in the memory of the network device.

The data erasure procedure may comprise replacing data stored in the memory of the network device.

The data erasure procedure may comprise changing a key used to encrypt data stored in the memory of the network device.

The data erasure procedure may comprise a clear level sanitization as defined according to NIST SP 800-88 (Revision 1).

The data erasure procedure may comprise executing an internal, built-in, default, factory and/or proprietary data erasure procedure associated with, or stored in, the network device, for example executing a reset procedure or an erase function associated with, or stored in, the network device.

The data erasure procedure may comprise clearing the data stored in the memory of the network device manually, for example through a computing resource and/or a user interface.

The data erasure procedure may comprise a purge level sanitization as defined according to NIST SP 800-88 (Revision 1).

The data erasure procedure may comprise updating and/or replacing software and/or firmware of the network device.

The network device may comprise a device which has a memory and which is configured to interconnect, or which enables the interconnection of, two or more computing resources.

The network device may comprise at least one of a router, a switch, a modem, a gateway, a firewall, a media converter, and a repeater.

The network device may comprise a router having a serial port.

The computing resource may be configured for logging in to the router by sending a username and password to the router via the serial port.

The computing resource may be configured for sending a trigger command to the router via the serial port to cause the router to initiate an internal, built-in, default, factory and/or proprietary data erasure procedure associated with, or stored in, the router, for example to cause the router to initiate a reset procedure or an erase function associated with, or stored in, the router.

The computing resource may be configured for providing the router with an image file. The computing resource may be configured for sending a trigger command to the router via the serial port to cause the router to use the image file to overwrite existing firmware of the router.

The computing resource may be configured for:
logging in to the router via the serial port after completion of the data erasure procedure;
requesting the data from the memory of the router via the serial port; and
receiving the response from the router via the serial port in reply to the request for data.

The computing resource may be configured for logging in to the router via the serial port after completion of the data erasure procedure by:
using a default username and password to log in to the router; or
re-setting the username and password.

The network device may have an Ethernet port for communication with a Wide Area Network (WAN).

The computing resource may be configured to establish a connection with the network device via the Ethernet port according to a WAN Management Protocol.

The WAN Management Protocol may comprise a TR-069 CPE WAN Management Protocol (CWMP).

The computing resource may be configured for sending a FactoryReset Remote Procedure Call (RPC) message to the network device to reset the network device to its factory default state and cause the memory of the network device to be erased.

The computing resource may be configured for sending a ScheduleDownload or a Download message to the network device to cause the network device to download a firmware update from a designated location and to apply the firmware update in order to overwrite existing firmware of the network device.

According to an aspect of the present disclosure there is provided a method for use in erasing data stored in the memory of a network device, the method comprising erasing all accessible data stored in the memory of the network device.

The stored accessible data may comprise one or more IP addresses.

The stored accessible data may comprise one or more MAC addresses.

The stored accessible data may comprise one or more usernames.

The stored accessible data may comprise one or more passwords.

The stored data may comprise a name of a local area network (LAN).

The stored data may comprise a password of the local area network (LAN).

The stored accessible data may comprise IP config data and/or boot setting data.

The stored accessible data may be stored in one or more data files and/or one or more configuration files in a file system in the memory of the network device.

Performing the data erasure procedure may comprise clearing all of the accessible data stored in the memory of the network device.

Performing the data erasure procedure may comprise replacing all of the accessible data stored in the memory of the network device.

Performing the data erasure procedure may comprise changing a key used to encrypt all of the accessible data stored in the memory of the network device.

The data erasure procedure may comprise a clear level sanitization as defined according to NIST SP 800-88 (Revision 1).

Performing the data erasure procedure may comprise executing an internal, built-in, default, factory and/or proprietary data erasure procedure associated with, or stored in, the network device, for example executing a reset procedure or an erase function associated with, or stored in, the network device.

Performing the data erasure procedure may comprise clearing all of the accessible data stored in the memory of the network device manually.

Performing the data erasure procedure may comprise clearing all of the accessible data stored in the memory of the network device using a computing resource and/or a user interface.

The data erasure procedure may comprise a purge level sanitization as defined according to NIST SP 800-88 (Revision 1).

Performing the data erasure procedure may comprise updating and/or replacing software and/or firmware of the network device.

The method may comprise requesting data from the memory of the network device after completion of the data erasure procedure.

The method may comprise receiving a response from the network device in reply to the request for data.

The method may comprise determining the outcome of the data erasure procedure based at least in part on the results of a comparison between a response received from the network device in reply to the request for data and an expected response which is indicative of a successful erasure of the memory of the network device.

The method may comprise accessing the memory of the network device after completion of the data erasure procedure.

The method may comprise determining the outcome of the data erasure procedure based at least in part on the results of a comparison between any contents of the memory of the network device after completion of the data erasure procedure and expected contents of the memory of the network device after completion of the data erasure procedure which are indicative of a successful erasure of the memory of the network device.

The method may comprise recording or storing the received response, for example recording or storing the received response in the Cloud.

The method may comprise recording or storing any contents of the memory of the network device after completion of the data erasure procedure, for example recording or storing any contents of the memory of the network device after completion of the data erasure procedure in the Cloud.

The method may comprise recording or storing the determined outcome of the data erasure procedure, for example recording or storing the determined outcome of the data erasure procedure in the Cloud.

The expected response may comprise a default response.

The expected contents of the memory of the network device may comprise default contents.

The method may comprise requesting IP address data from the memory of the network device after completion of the data erasure procedure. The method may comprise determining a successful outcome based at least in part on verifying that the received response from the network device does not include any IP address data assigned to the network device.

The method may comprise accessing a pre-defined portion of the memory of the network device used to store IP address data after completion of the data erasure procedure. The method may comprise determining a successful outcome based at least in part on verifying that the pre-defined portion of the memory of the network device used to store IP address data does not include any IP address data after completion of the data erasure procedure.

The method may comprise requesting MAC address data from the memory of the network device after completion of the data erasure procedure. The method may comprise determining a successful outcome based at least in part on verifying that the received response from the network device does not include any MAC address data assigned to the network device.

The method may comprise accessing a pre-defined portion of the memory of the network device used to store MAC address data after completion of the data erasure procedure. The method may comprise determining a successful outcome based at least in part on verifying that the pre-defined portion of the memory of the network device used to store MAC address data does not include any MAC address data after completion of the data erasure procedure.

The method may comprise requesting running configuration data from the memory of the network device after completion of the data erasure procedure. The method may comprise determining a successful outcome based at least in part on verifying that the received response from the network device corresponds to an expected running configuration or a default running configuration which is indicative of a successful erasure of the memory of the network device.

The method may comprise accessing a pre-defined portion of the memory of the network device used to store running configuration data after completion of the data erasure procedure. The method may comprise determining a successful outcome based at least in part on verifying that the pre-defined portion of the memory of the network device used to store running configuration data includes running configuration data that corresponds to an expected running configuration which is indicative of a successful erasure of the memory of the network device.

The method may comprise requesting a name and a password of a local area network from the memory of the network device after completion of the data erasure procedure. The method may comprise determining a successful outcome based at least in part on verifying that the received name and password of the local area network correspond to an expected name and an expected password of the local area network respectively.

The method may comprise accessing a pre-defined portion of the memory of the network device that is used to store a name and a password of a local area network (LAN) after completion of the data erasure procedure. The method may comprise verifying that a name and a password of the local area network (LAN) stored in the pre-defined portion of the memory of the network device that is used to store a name and a password of the local area network (LAN) after completion of the data erasure procedure correspond to an expected name and an expected password of the local area network (LAN) respectively.

The method may comprise requesting network device information from the network device.

The method may comprise receiving network device information from the network device in reply to the request for network device information.

The method may comprise selecting the data erasure procedure from a database of data erasure procedures based at least in part on the received network device information.

The method may comprise selecting the expected response which is indicative of a successful erasure of the memory of the network device from a database of expected responses based at least in part on the received network device information.

The method may comprise accessing network device information stored in the memory of the network device.

The method may comprise selecting the data erasure procedure from a database of data erasure procedures based at least in part on the accessed network device information.

The method may comprise selecting the expected contents of the memory of the network device which are indicative of a successful erasure of the memory of the network device from a database of expected contents based at least in part on the accessed network device information.

The network device information may comprise at least one of a make, a model number of the network device, and/or details of an operating system of the network device such as a type and/or version of the operating system of the network device.

At least one of the database of data erasure procedures, the database of expected responses, and the database of expected contents comprises a profiler API.

The method may comprise requesting initial data from the memory of the network device before commencing the data erasure procedure.

The method may comprise receiving an initial response from the network device in reply to the request for initial data.

The method may comprise determining the outcome of the data erasure procedure based at least in part on the results of a comparison between an initial response received from the network device in reply to the request for initial data and the received response from the network device.

The method may comprise accessing the memory of the network device before commencing the data erasure procedure.

The method may comprise determining the outcome of the data erasure procedure based at least in part on the results of a comparison between any initial contents of the memory of the network device before commencing the data erasure procedure and any contents of the memory of the network device after completion of the data erasure procedure.

The method may comprise determining that the outcome of the data erasure procedure is successful based at least in part on verifying that a routing table of the network device has been cleared of any IP addresses and/or cleared of any MAC addresses.

The network device may comprise a device which has a memory and which is configured to interconnect, or which enables the interconnection of, two or more computing resources.

The network device may comprise at least one of a router, a switch, a modem, a gateway, a firewall, a media converter, and a repeater.

The network device may comprise a router having a serial port.

The network device may have an Ethernet port for communication with a Wide Area Network (WAN).

The method may comprise establishing a connection with the network device via the Ethernet port according to a WAN Management Protocol.

The WAN Management Protocol may comprise a TR-069 CPE WAN Management Protocol.

It should be understood that any one or more of the features of any one of the foregoing aspects of the present disclosure may be combined with any one or more of the features of any of the other foregoing aspects of the present disclosure.

BRIEF DESCRIPTION OF THE DRAWINGS

Systems and methods for use in erasing data stored in a memory of a network device will now be described by way of non-limiting example only with reference to the accompanying drawings of which:

FIG. 5A illustrates a response to a request for routing table data from the industrial router of FIG. 2 after successful execution of a data erasure procedure;

FIG. 5B illustrates a response to a request for routing table data from the industrial router of FIG. 2 after unsuccessful execution of a data erasure procedure;

FIG. 6A illustrates a response to a request for configuration data from the industrial router of FIG. 2 after successful execution of a data erasure procedure;

FIG. 6B illustrates a response to a request for configuration data from the industrial router of FIG. 2 after unsuccessful execution of a data erasure procedure;

FIG. 7A illustrates a response to a request for a listing of user created files stored in the memory of the industrial router of FIG. 2 after successful execution of a data erasure procedure;

FIG. 7B illustrates a response to a request for a listing of user created files stored in the memory of the industrial router of FIG. 2 after unsuccessful execution of a data erasure procedure;

DETAILED DESCRIPTION OF THE DRAWINGS

Figure 1:
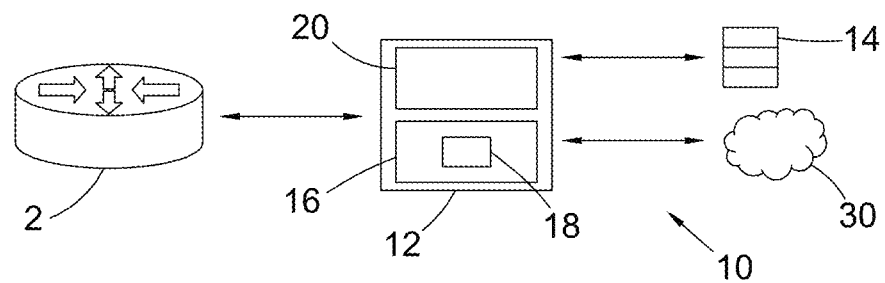
FIG. 1 is a schematic of a generic router and a generic system for use in erasing data stored in a memory of the generic router.

Referring initially to FIG. 1 there is provided a network device in the form of a generic router 2 and a generic system generally designated 10 for use in erasing data stored in a memory of the generic router 2. The system 10 includes a computing resource in the form of a host computer 12 and a remote database 14. The host computer 12 includes a memory 16 and a processing resource 20. The memory 16 stores a computer program 18. As indicated by the arrows, the host computer 12 is configured for communication with the router 2, the database 14, and the Cloud 30.

The remote database 14 stores a look-up table which includes router information such as a make and model number of the router 2 and/or details of an operating system of the router 2 such as a type and/or version number of the operating system of the router 2. Also stored in the look-up table in association with the router information, is one or more suitable data erasure procedures and one or more expected or default router responses which are indicative of a successful erasure of the memory of the router 2.

As will be described in more detail below, when executed by the processing resource 20, the computer program 18 causes the host computer 12 to perform a generic method for use in erasing data stored in a memory of the router 2 which begins with the host computer 12 requesting router information from the router 2. In reply to the request for router information, the host computer 12 receives the router information from the router 2. The host computer 12 then selects a suitable data erasure procedure for erasing data stored in the memory of the router 2 from the look-up table stored in the remote database 14 based at least in part on the received router information. In addition, the host computer 12 uses the received router information to select an expected or default response which is indicative of a successful erasure of the memory of the router 2 from the look-up table stored in the remote database 14 based at least in part on the received router information.

The host computer 12 then triggers, initiates or performs the selected data erasure procedure to erase the stored data from the memory of the router 2. After completion of the data erasure procedure, the host computer 12 requests data from the memory of the router 2 and receives a response from the router 2 in reply to the request for data. The host computer 12 determines the outcome of the data erasure procedure based at least in part on the results of a comparison between the received response from the router 2 and the expected or default response which is indicative of a successful erasure of the memory of the router 2. The host computer 12 then records or stores the determined outcome of the data erasure procedure, for example in the host computer 12 and/or in the Cloud 30. Additionally or alternatively, the host computer 12 records or stores the received response in the host computer 12 and/or in the Cloud 30. Storing the determined outcome of the data erasure procedure and/or the received response may provide an audit trail, for example to allow a third party to verify successful erasure of the router 2 on demand at a later date.

Figure 2A:
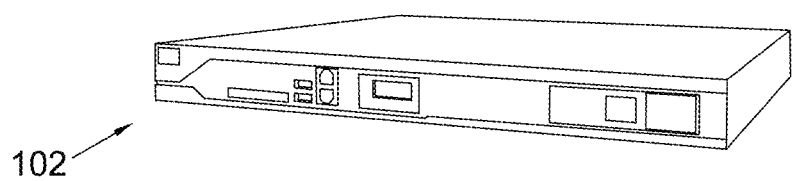
FIG. 2A shows a rear view of an industrial router which includes one or more ethernet ports and an additional serial port.
Figure 2B:
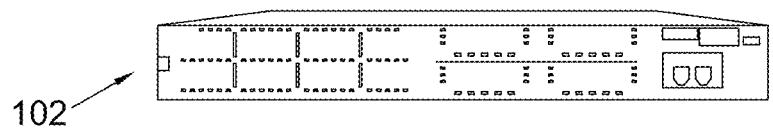
FIG. 2B shows a front view of the industrial router of FIG. 2A.
Figure 4:
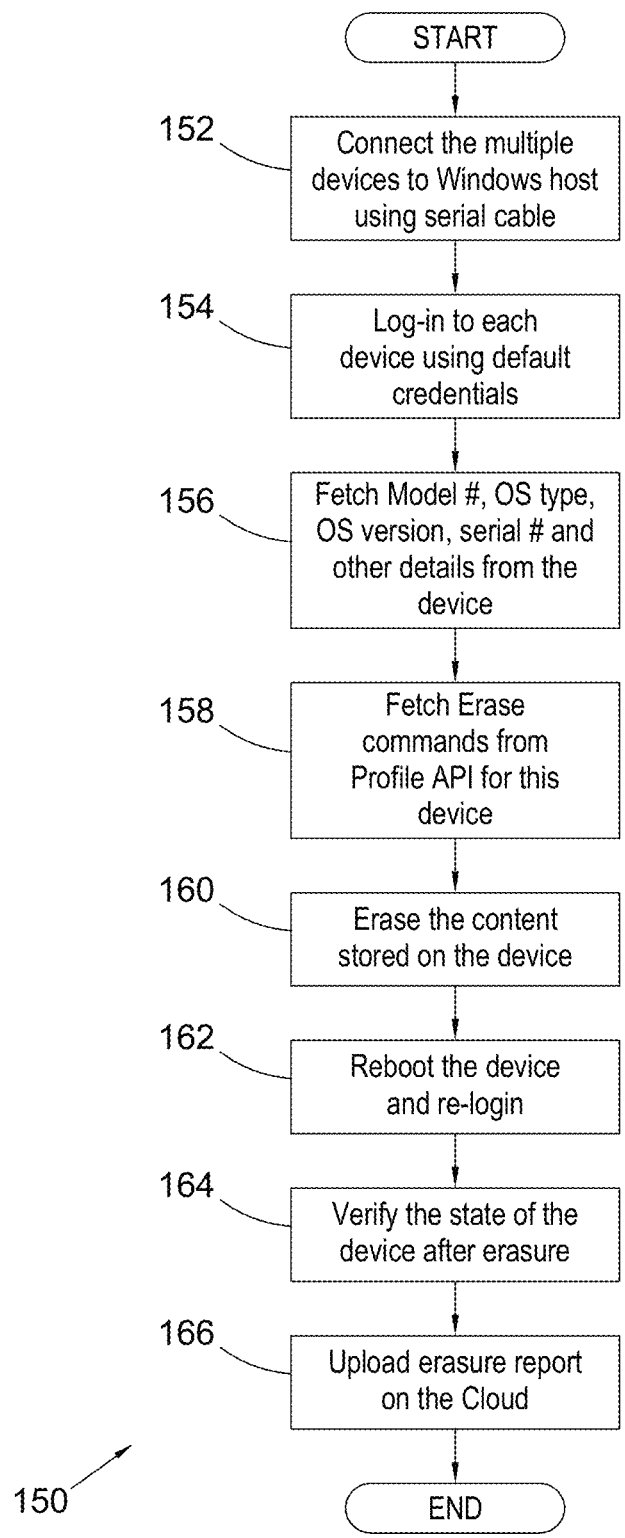
FIG. 4 is a flow chart of a method for use in erasing data stored in the memory of the industrial router of FIG. 2.

Referring now to FIGS. 2A and 2B, there is shown an industrial router generally designated 102 which includes one or more Ethernet ports and an additional serial port such as 9-pin or 25-pin serial port. The router 102 uses a serial protocol and a command set which are typically vendor-specific. A method generally designated 150 for use in erasing data stored in a memory of the router 102 will now be described with reference to FIG. 4. It should be understood that the method 150 is based on the generic method for use in erasing data stored in a memory of the generic router 2 described above with reference to FIG. 1 and is performed using a system which has the same general form of the generic system 10 of FIG. 1, but wherein the host computer 12 takes the form of a Windows host and the database 14 takes the form of a Profiler API.

The method 150 begins at step 152 with the connection of one or more routers 102 to the Windows host using one or more serial cables.

At step 154, a user logs into the router 102 via the Windows host to establish a connection between the router 102 and the Windows host via the serial port.

At step 156, the processing resource 20 executes the software 18 causing the Windows host to fetch router information from the router 102 including a make and model number, operating system type, operating system version, and serial number of the router 102.

At step 158, the Windows host uses the fetched router information to fetch a suitable erasure procedure from the profiler API. At the same time, the Windows host uses the fetched router information to fetch an expected or default response which is indicative of a successful erasure of the memory of the router 102 from the profiler API.

At step 160, the Windows host initiates or executes the fetched erasure procedure to erase data from the memory of the router 102. For example, the Windows host may send a trigger command to the router 102 via the serial port to cause the router 102 to initiate an internal, built-in, default, factory and/or proprietary data erasure procedure associated with, or stored in, the router 102, for example to cause the router 102 to initiate a reset procedure or an erase function associated with, or stored in, the router 102 so as to erase data such as data files and configuration files from a file system of the router 102.

At step 162, the router 102 is re-booted and the user logs back in to the router 102 by using a default username and password of the router 102 or, if required, by re-setting the username and/or password of the router 102.

At step 164, the Windows host performs a verification procedure to check whether the erasure procedure was executed successfully at step 160. Specifically, the Windows host requests data from the memory of the router 102 after completion of the data erasure procedure. The Windows host receives a response from the router 102 in reply to the request for data and then determines the outcome of the data erasure procedure based at least in part on the results of a comparison between the received response from the router 102 and the fetched expected or default response which is indicative of a successful erasure of the memory of the router 102.

For example, as will be described below with reference to FIGS. 5A and 5B, the Windows host checks whether the contents of a routing table of the router 102 have been cleared of network IP addresses. In the case of Cisco routers, this may be done using a "Show ip arp" command. Specifically, the Windows host sends a "Show ip arp" command to the router 102 via the serial port to request routing table data from the memory of the router 102 via the serial port. In the event of a successful erasure of data from the memory of the router 102 at step 160, the router 102 does not return any IP addresses to the Windows host in response to the "Show ip arp" command as shown in FIG. 5A, indicating that the routing table is empty or that there are no IP addresses assigned to the router 102, thereby indicating successful erasure of data from the memory of the router 102 at step 160. However, in the event of an unsuccessful erasure of data from the memory of the router 102 at step 160, in response to the "Show ip arp" command, the router 102 may return a list of one or more IP addresses to the Windows host, wherein the one or more IP addresses were stored in the memory of the router 102 prior to execution of the erasure procedure. For example, as shown in FIG. 5B, in response to the "Show ip arp" command, the router 102 may return an IP address "10.1.169.12" to the Windows host indicating unsuccessful erasure of data from the memory of the router 102 at step 160.

Additionally or alternatively at step 164, as will be described below with reference to FIGS. 6A and 6B, the Windows host verifies the erasure result by checking the running configuration of the router 102. In the case of Cisco routers, this may be done using a "Show startup-config" command. Specifically, the Windows host sends a "Show startup-config" command to the router 102 via the serial port to request configuration data from the router 102 via the serial port. In the event of a successful erasure of data from the memory of the router 102 at step 160, the router 102 may return start-up configuration data to the Windows host like that shown in the example of FIG. 6A reciting:

"Using 9 out of 524284 bytes, uncompressed size=5 bytes end"

in response to the "Show startup-config" command, thereby indicating successful erasure of data from the memory of the router 102 at step 160. However, in the event of an unsuccessful erasure of data from the memory of the router 102 at step 160, the router 102 may return start-up configuration data of the router 102 to the Windows host like that shown in the example of FIG. 6B in response to the "Show startup-config" command.

Additionally or alternatively at step 164, the Windows host verifies the erasure result by checking for the presence of any files in the memory of the router 102. In the case of Cisco routers, this may be done using a "dir nvram" command. Specifically, the Windows host sends a "dir nvram" command to the router 102 via the serial port to request a list of files stored in the memory of the router 102 via the serial port. In the event of a successful erasure of data from the memory of the router 102 at step 160, the router 102 may return file information to the Windows host like that shown in the example of FIG. 7A in response to the "dir nvram" command, thereby indicating successful erasure of data from the memory of the router 102 at step 160. However, in the event of an unsuccessful erasure of data from the memory of the router 102 at step 160, the router 102 may return file information to the Windows host like that shown in the example of FIG. 7B in response to the "dir nvram" command.

The method 150 for use in erasing data stored in a memory of the router 102 ends at step 166 with the Windows host storing a verification report and/or uploading a verification report to the Cloud to provide an audit trail, for example to allow a third party to verify successful erasure of the router 102 on demand at a later date. The verification report may include the outcome of the verification step 164. The verification report may include one or more of the responses returned from the router 102 to the Windows host in reply to one or more of the "Show ip arp", "Show startup-config", and the "dir nvram" commands.

In a variant of the method 150 described above with reference to FIG. 4, rather than sending a trigger command to the router 102 via the serial port to cause the router 102 to initiate an internal, built-in, default, factory and/or proprietary data erasure procedure associated with, or stored in, the router 10 at step 160, the Windows host may trigger an update of the firmware of the router 102. Specifically, the Windows host may provide the router 102 with an image file and send a trigger command to the router 102 via the serial port to cause the router 102 to use the image file to overwrite existing firmware of the router 102.

From the foregoing description of steps 160 and 164 of the method 150, one of ordinary skill in the art will understand that successful execution of the erasure procedure results in erasure of all of the accessible data from the router 102 including the erasure of all IP addresses stored in the memory of the router 102 of any network devices that have been connected to the router 102, the erasure of all user-defined start-up configuration data stored in the memory of the router 102, and the erasure of all user-defined file information stored in the memory of the router 102.

Figure 3:
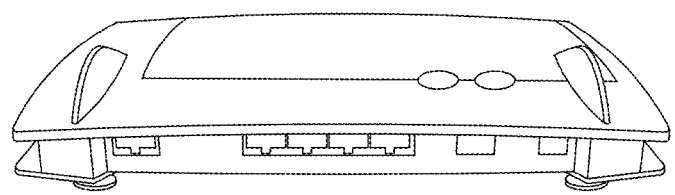
FIG. 3 shows a router which includes remote management support compliant with the TR-069 CPE WAN Management Protocol.

Referring now to FIG. 3, there is shown a router generally designated 202 which includes at least one Ethernet port assigned for communication with a Wide Area Network (WAN) according to a WAN Management Protocol in the form of the TR-069 CPE WAN Management Protocol. A method for use in erasing data stored in a memory of the router 202 will now be described. It should be understood that the method for use in erasing data stored in a memory of the router 202 is based on the generic method for use in erasing data stored in a memory of the generic router 2 described above with reference to FIG. 1 and is performed using a system which has the same general form of the generic system 10 of FIG. 1, but wherein the host computer 12 establishes a connection to the router 202 via the WAN port of the router 202. Specifically, the host computer 12 provides a Dynamic Host Configuration Protocol (DHCP) service and an Auto Configuration Server (ACS) service, according to the TR-069 CPE WAN Management Protocol and the router 202 sends a DHCP discovery message to the host computer 12. The DHCP service assigns an IP address to the router 202. The router 202 initiates a connection with the ACS service and the router 202 sends router information or details to the ACS service.

Once the host computer 12 and the router 202 have established a connection, the host computer 12 executes the computer program 18 causing the host computer 12 to perform a method for use in erasing data stored in a memory of the router 202 which begins with the host computer 12 accessing router information stored in the memory of the router 202. The host computer 12 then selects a suitable data erasure procedure from the look-up table stored in the remote database 14 based at least in part on the accessed router information. In addition, the host computer 12 uses the accessed router information to select expected or default contents of the memory of the router 202 which are indicative of a successful erasure of the memory of the router 202 from the look-up table stored in the remote database 14 based at least in part on the accessed router information.

In one example, the host computer 12 selects a FactoryReset Remote Procedure Call (RPC) data erasure procedure and the ACS service sends a FactoryReset Remote Procedure Call (RPC) message to the router 202 triggering the router 202 to execute a factory reset procedure to thereby reset the router 202 to its factory default state and erase data stored in the memory of the router 202.

After execution of the factory reset procedure, the host computer 12 logs in to the router 202 using a default username and password, for example "admin" and "1234".

Following a successful login, or reconnection between the host computer 12 and the router 202 via ACS, the host computer 12 then performs a verification procedure to check whether the erasure procedure was executed successfully. Specifically, the host computer 12 accesses the memory of the router 202 after completion of the data erasure procedure. The host computer 12 determines the outcome of the data erasure procedure based at least in part on the results of a comparison between any contents of the memory of the router 202 and the expected contents which are indicative of a successful erasure of the memory of the router 202. For example, the host computer 12 determines whether the data erasure procedure is successful based at least in part on whether the memory of the router 202 includes any IP addresses and/or any MAC addresses. In the event that the memory of the router 202 does not include any IP addresses and/or any MAC addresses, the host computer 12 determines that the data erasure procedure was performed successfully, otherwise the host computer 12 determines that the data erasure procedure was performed unsuccessfully.

Figure 8A:
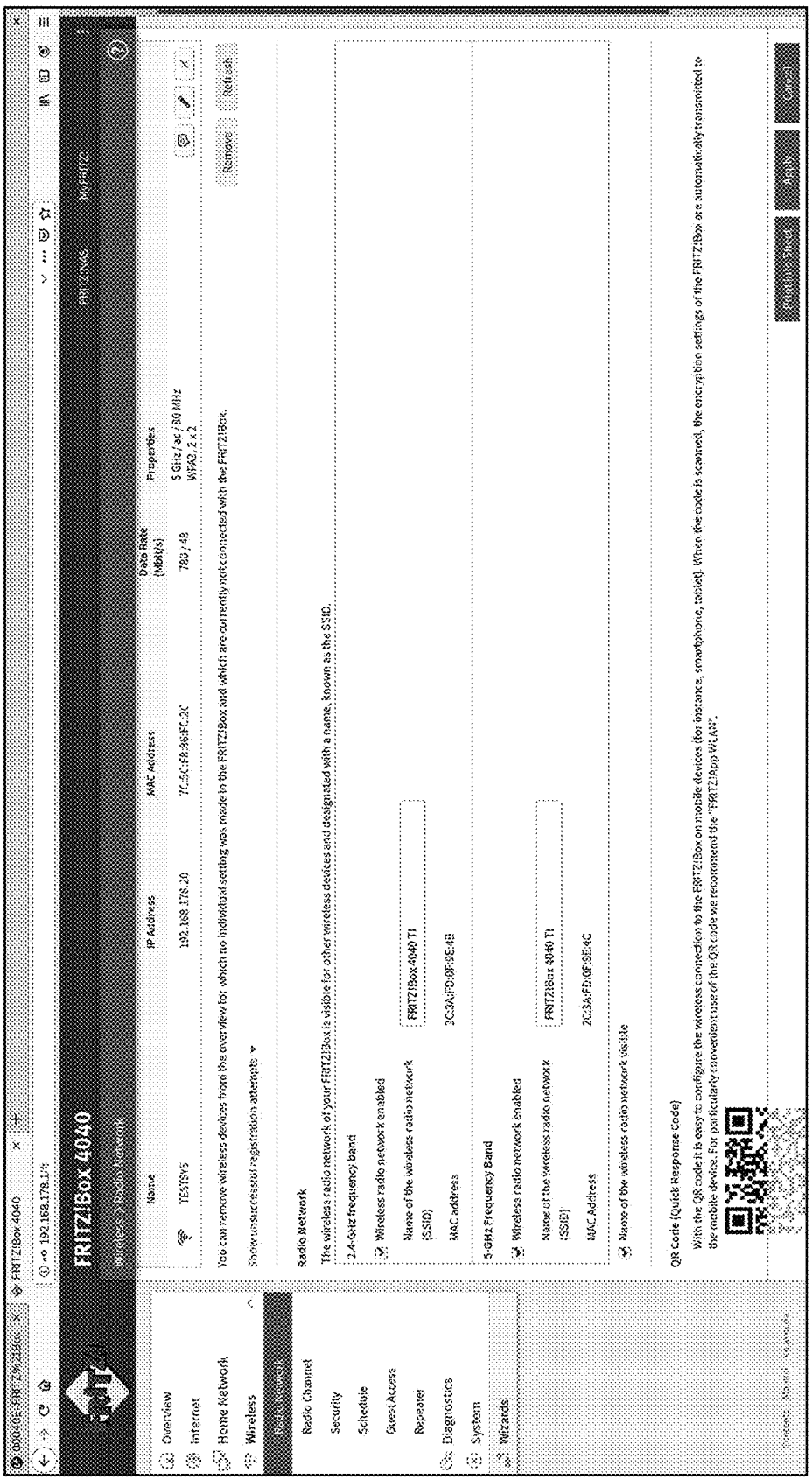
FIG. 8A illustrates a response to a request for a listing of IP addresses and MAC addresses stored in the memory of the router of FIG. 3 as viewed in a native user interface of the router after successful execution of a data erasure procedure.
Figure 8B:
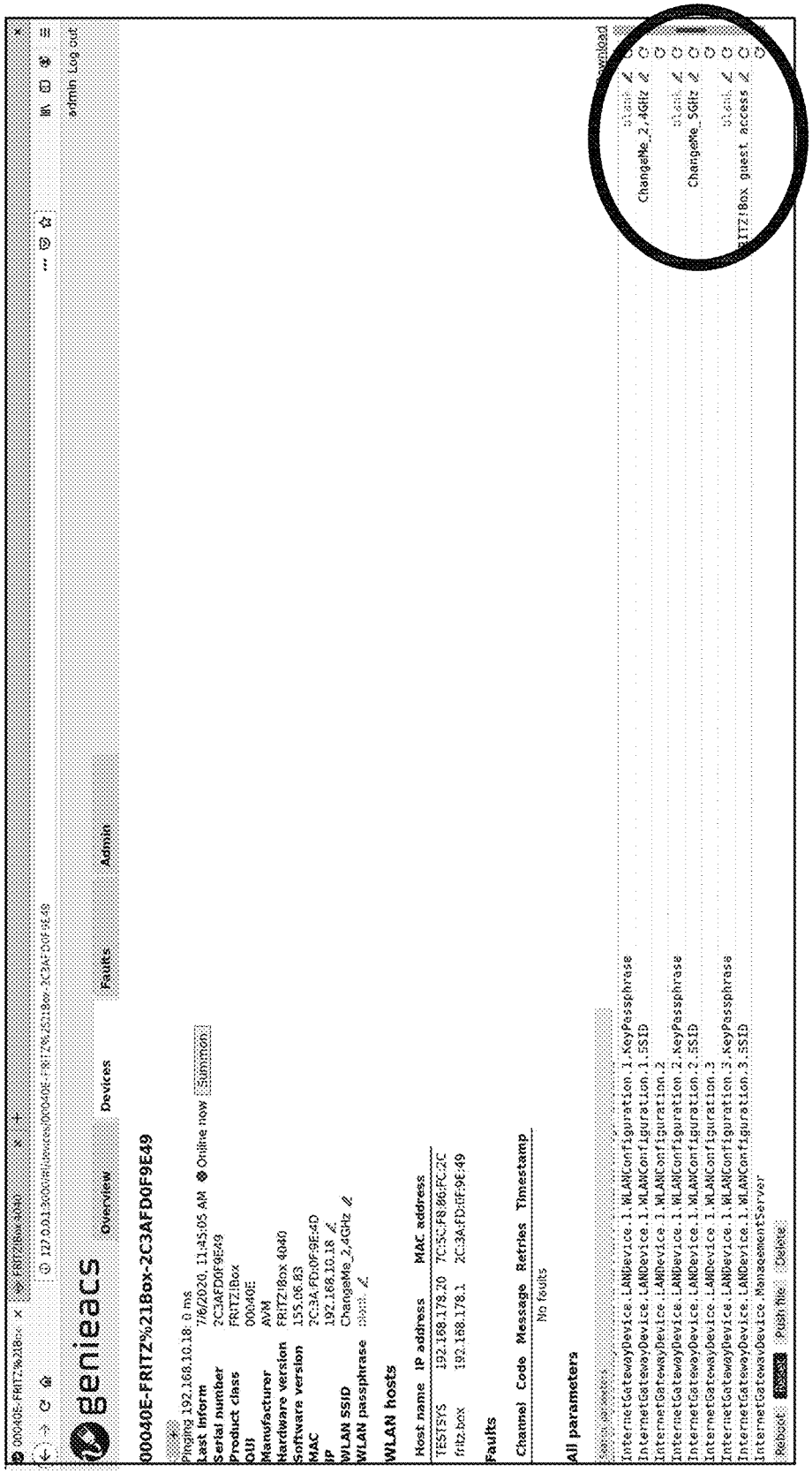
FIG. 8B illustrates a response to a request for a listing of IP addresses and MAC addresses stored in the memory of the router of FIG. 3 as viewed from Auto Configuration Server (ACS) software after unsuccessful execution of a data erasure procedure.
Figure 8C:
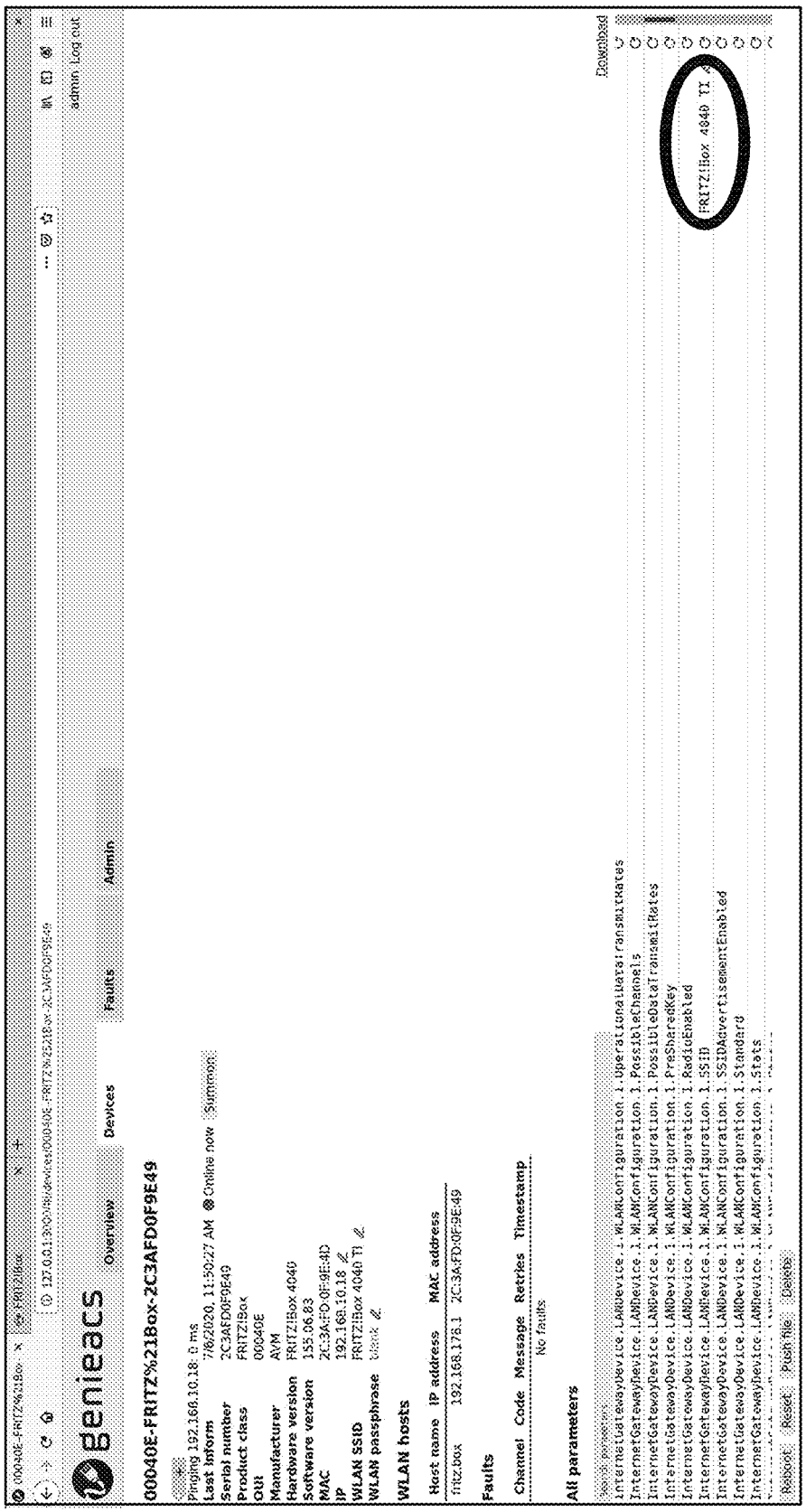
FIG. 8C illustrates a response to a request for a listing of IP addresses and MAC addresses stored in the memory of the router of FIG. 3 as viewed from Auto Configuration Server (ACS) software after successful execution of a data erasure procedure.

Additionally or alternatively, the host computer 12 may access local area network (LAN) name and password data from the router 202 after completion of the data erasure procedure. The host computer 12 then determines the outcome of the data erasure procedure based at least in part on the results of a comparison between the accessed local area network (LAN) name and password and the expected local area network (LAN) name and password which are indicative of a successful erasure of the memory of the router 202. In the event that the accessed local area network (LAN) name and password correspond to the expected or default local area network (LAN) name and password, the host computer 12 determines that the data erasure procedure was performed successfully, otherwise the host computer 12 determines that the data erasure procedure was performed unsuccessfully. For example, FIGS. 8A-8C illustrate a verification procedure which may be used to check whether the factory reset procedure was executed successfully. The screen shot of FIG. 8A shows an admin panel of the router 202 (or a native User Interface of the router 202) after successful execution of the factory reset procedure. Specifically, FIG. 8A shows the "Radio Network" tab where a user may enable or disable 2.4 GHz and 5 GHz wireless networks and change their names (SSIDs). After execution of the factory reset procedure, the names of the 2.4 GHz and 5 GHz wireless networks have returned to the default name "FRITZ!Box 4040 TI" indicating that the factory reset procedure was executed successfully and that the memory of the router 202 has been erased successfully. Similarly, on the "Security" tab (not shown) the user may change the passwords for the wireless networks. After execution of the factory reset procedure, the passwords for the wireless networks return to the default password indicating that the factory reset procedure was executed successfully and that the memory of the router 202 has been erased successfully.

Similarly, FIG. 8B shows the wireless network names (SSIDs), accessed by the Auto Configuration Server (ACS) before execution of the factory reset procedure. Here the 2.4 GHz and 5 GHz networks have been renamed by the user to "ChangeMe_2.4 GHz" and "ChangeMe_5 GHz" respectively. FIG. 8C shows the 2.4 GHz wireless network name (SSID) after the execution of the factory reset procedure by the ACS. Here the network name has been reset back to the default name indicating that the factory reset procedure was executed successfully and that the memory of the router 202 has been erased successfully. Similarly, the wireless network password (not shown) has been reset back to the default password indicating that the factory reset procedure was executed successfully and that the memory of the router 202 has been erased successfully.

The method for use in erasing data stored in a memory of the router 202 ends with the host computer 12 storing a verification report and/or uploading a verification report to the Cloud 30 to provide an audit trail, for example to allow a third party to verify successful erasure of the router 202 on demand at a later date. The verification report may include the outcome of the verification step. The verification report may include the a listing of any IP addresses and MAC addresses stored in the router 202. The verification report may include the accessed local area network (LAN) name and password.

In a variant of the method for use in erasing data stored in a memory of the router 202 described above, the host computer 12 may trigger, initiate or perform a firmware update for the router 202. For example, the ACS service may send a "ScheduleDownload" or a "Download" message in order to cause the router 202 to download a firmware update from a designated location and apply the firmware update in order to overwrite existing firmware of the router 202. It should be understood that "ScheduleDownload" and "Download" messages are baseline messages which need to be implemented according to the TR-069 CPE WAN Management Protocol.

From the foregoing description of the method for use in erasing data stored in a memory of the router 202 with reference to FIGS. 8A to 8C, one of ordinary skill in the art will understand that successful execution of the erasure procedure results in erasure of all of the accessible data from the router 202 including the erasure of all IP addresses and all MAC addresses stored in the memory of the router 202, and the erasure of all local area network (LAN) names and passwords stored in the memory of the router 202.

One of ordinary skill in the art will understand that various modifications are possible to the methods for use in erasing data stored in a memory of a router described above with reference to FIGS. 1 to 8C. For example, although the methods are described in the context of routers 2, 102, 202, the methods may be performed in relation to any network device which has a memory and which is configured to interconnect, or which enables the interconnection of, two or more computing resources. For example, the methods may be performed in relation to at least one of a router, a switch, a modem, a gateway, a firewall, a media converter, and a repeater.

Any of the methods describe above may comprise:
requesting initial data from the memory of a network device before commencing the data erasure procedure;
receiving an initial response from the network device in reply to the request for initial data; and
determining the outcome of the data erasure procedure based at least in part on the results of a comparison between the received initial response from the network device and the received response from the network device.

Any of the methods describe above may comprise:
accessing the memory of the network device before commencing the data erasure procedure; and
determining the outcome of the data erasure procedure based at least in part on the results of a comparison between any initial contents of the memory of the network device before commencing the data erasure procedure and any contents of the memory of the network device after completion of the data erasure procedure.

The data stored in the memory of the network device may comprise one or more IP addresses.

The data stored in the memory of the network device may comprise one or more MAC addresses.

The data stored in the memory of the network device may comprise one or more usernames and/or one or more passwords.

The data stored in the memory of the network device may comprise configuration data such as IP config data and/or boot setting data.

The data stored in the memory of the network device may be stored in one or more data files and/or one or more configuration files in a file system in the memory of the network device.

The data erasure procedure may be configured to erase all accessible data stored in the memory of the network device.

Performing the data erasure procedure may comprise clearing data stored in the memory of the network device.

Performing the data erasure procedure may comprise replacing data stored in the memory of the network device.

Performing the data erasure procedure may comprise changing a key used to encrypt data stored in the memory of the network device.

The data erasure procedure may comprise a clear level sanitization as defined according to NIST SP 800-88 (Revision 1).

Performing the data erasure procedure may comprise executing an internal, built-in, default, factory and/or proprietary data erasure procedure associated with, or stored in, the network device, for example executing a reset procedure or an erase function associated with, or stored in, the network device.

Performing the data erasure procedure may comprise clearing the data stored in the memory of the network device manually.

Performing the data erasure procedure may comprise clearing the data stored in the memory of the network device using a computing resource and/or a user interface.

The data erasure procedure may comprise a purge level sanitization as defined according to NIST SP 800-88 (Revision 1).

Performing the data erasure procedure may comprise updating and/or replacing software and/or firmware of the network device.

One of ordinary skill in the art will understand that one or more of the features of the systems or methods described above with reference to the drawings may produce effects or provide advantages when used in isolation from one or more of the other features of the systems or methods described above and that different combinations of the features are possible other than the specific combinations of the features of the systems or methods described above.

The invention claimed is:

1. A method for use in erasing data stored in the memory of a network device, the method comprising:
performing a data erasure procedure to erase stored data from the memory of the network device;
requesting data from the memory of the network device after completion of the data erasure procedure or accessing the memory of the network device after completion of the data erasure procedure;
determining the outcome of the data erasure procedure based at least in part on:
the results of a comparison between a response received from the network device in reply to the request for data and an expected response which is indicative of a successful erasure of the memory of the network device; or the results of a comparison between any contents of the memory of the network device after completion of the data erasure procedure and expected contents of the memory of the network device after completion of the data erasure procedure which are indicative of a successful erasure of the memory of the network device;

wherein the network device has an Ethernet port for communication with a Wide Area Network (WAN) and the method comprises establishing a connection with the network device via the Ethernet port according to a WAN Management Protocol, for example wherein the WAN Management Protocol comprises a TR-069 CPE WAN Management Protocol; and further comprising sending a FactoryReset Remote Procedure Call (RPC) message to the network device to reset the network device to its factory default state and cause the memory of the network device to be erased and/or sending a ScheduleDownload or a Download message to the network device to cause the network device to download a firmware update from a designated location and to apply the firmware update in order to overwrite existing firmware of the network device.

2. A method as claimed in claim 1, comprising recording or storing at least one of the received response, any contents of the memory of the network device, and the determined outcome of the data erasure procedure, for example in the Cloud.

3. A method as claimed in claim 1, wherein the expected response comprises a default response or wherein the expected contents of the memory of the network device comprise default contents.

4. A method as claimed in claim 1, comprising:
requesting IP address data and/or MAC address data from the memory of the network device after completion of the data erasure procedure or accessing a pre-defined portion of the memory of the network device used to store IP address data and/or MAC address data after completion of the data erasure procedure; and
determining a successful outcome based at least in part on:
verifying that the received response from the network device does not include any IP address data and/or any MAC address data after completion of the data erasure procedure; or
verifying that the pre-defined portion of the memory of the network device used to store IP address data and/or MAC address data does not include any IP address data and/or any MAC address data after completion of the data erasure procedure.

5. A method as claimed in claim 1, comprising:
requesting running configuration data from the memory of the network device after completion of the data erasure procedure or accessing a pre-defined portion of the memory of the network device used to store running configuration data after completion of the data erasure procedure; and
determining a successful outcome based at least in part on:
verifying that the received response from the network device corresponds to an expected running configuration which is indicative of a successful erasure of the memory of the network device; or
verifying that the pre-defined portion of the memory of the network device used to store running configuration data includes running configuration data that corresponds to an expected running configuration which is indicative of a successful erasure of the memory of the network device.

6. A method as claimed in claim 1, comprising:
requesting a name and a password of a local area network (LAN) from the memory of the network device after completion of the data erasure procedure or accessing a pre-defined portion of the memory of the network device that is used to store a name and a password of a local area network (LAN) after completion of the data erasure procedure; and
determining a successful outcome based at least in part on:
verifying that the received username and password of the network device correspond to an expected username and an expected password of the network device respectively; or
verifying that a name and a password of the local area network (LAN) stored in the pre-defined portion of the memory of the network device that is used to store a name and a password of the local area network (LAN) after completion of the data erasure procedure correspond to an expected name and an expected password of the local area network (LAN) respectively.

7. A method as claimed in claim 1, comprising:
requesting network device information from the network device or accessing network device information stored in the memory of the network device;
selecting the data erasure procedure from a database of data erasure procedures based at least in part on network device information received from the network device in reply to the request for network device information or selecting the data erasure procedure from a database of data erasure procedures based at least in part on the accessed network device information; and
selecting the expected response which is indicative of a successful erasure of the memory of the network device from a database of expected responses based at least in part on the received network device information or selecting the expected contents of the memory of the network device which are indicative of a successful erasure of the memory of the network device from a database of expected contents based at least in part on the accessed network device information.

8. A method as claimed in claim 7, wherein the network device information comprises at least one of a make, a model number of the network device, or details of an operating system of the network device such as a type and/or version of the operating system of the network device, and/or wherein at least one of the database of data erasure procedures, the database of expected responses, or the database of expected contents comprises a profiler API.

9. A method as claimed in claim 1, comprising:
requesting initial data from the memory of the network device before commencing the data erasure procedure or accessing the memory of the network device before commencing the data erasure procedure; and
determining the outcome of the data erasure procedure based at least in part on:
the results of a comparison between an initial response received from the network device in reply to the request for initial data and the received response from the network device after completion of the data erasure procedure; or the results of a comparison between any initial contents of the memory of the network device before commencing the data erasure procedure and any contents of the memory of the network device after completion of the data erasure procedure and, optionally, the method further comprising determining that the outcome of the data erasure procedure is successful based at least in part on verifying that a routing table of the network device has been cleared of any IP addresses and/or cleared of any MAC addresses.

10. A method as claimed in claim 1, wherein the stored data comprises at least one of:
one or more IP addresses;
one or more MAC addresses;
one or more usernames;
one or more passwords;
a local area network (LAN) name;
a local area network (LAN) password;
IP config data;
boot setting data.

11. A method as claimed in claim 1, wherein the stored data is stored in one or more data files and/or one or more configuration files in a file system in the memory of the network device.

12. A method as claimed in claim 1, wherein the data erasure procedure is configured to erase all accessible data stored in the memory of the network device.

13. A method as claimed in claim 1, wherein performing the data erasure procedure comprises at least one of:
clearing data stored in the memory of the network device;
replacing data stored in the memory of the network device;
changing a key used to encrypt data stored in the memory of the network device;
executing an internal, built-in, default, factory and/or proprietary data erasure procedure associated with, or stored in, the network device, for example executing a reset procedure or an erase function associated with, or stored in, the network device;
clearing the data stored in the memory of the network device manually;
clearing the data stored in the memory of the network device using a computing resource and/or a user interface; and
updating and/or replacing software and/or firmware of the network device.

14. A method as claimed in claim 1, wherein the data erasure procedure comprises a clear level sanitization as defined according to NIST SP 800-88 (Revision 1) or a purge level sanitization as defined according to NIST SP 800-88 (Revision 1).

15. A method as claimed in claim 1, wherein the network device comprises a device which has a memory and which is configured to interconnect, or which enables the interconnection of, two or more computing resources, for example wherein the network device comprises at least one of a router, a switch, a modem, a gateway, a firewall, a media converter, and a repeater.

16. A method as claimed in claim 1, wherein the network device comprises a router having a serial port and the method comprises logging in to the router by sending a username and password to the router via the serial port and, optionally, the method further comprising sending a trigger command to the router via the serial port to cause the router to initiate an internal, built-in, default, factory and/or proprietary data erasure procedure associated with, or stored in, the router, for example to cause the router to initiate a reset procedure or an erase function associated with, or stored in, the router and, optionally, the method further comprising:
providing the router with an image file; and
sending a trigger command to the router via the serial port to cause the router to use the image file to overwrite existing firmware of the router.

17. A method as claimed in claim 16, comprising:
logging in to the router via the serial port after completion of the data erasure procedure;
requesting the data from the memory of the router via the serial port; and
receiving the response from the router via the serial port in reply to the request for data, wherein logging in to the router via the serial port after completion of the data erasure procedure comprises:
using a default username and password to log in to the router; or
re-setting the username and password.

18. A method for use in erasing data stored in the memory of a network device comprising:
erasing all accessible data stored in the memory of the network device;
requesting data from the memory of the network device after completion of the data erasure procedure or accessing the memory of the network device after completion of the data erasure procedure; and
determining the outcome of the data erasure procedure based at least in part on:
the results of a comparison between a response received from the network device in reply to the request for data and an expected response which is indicative of a successful erasure of the memory of the network device; or
the results of a comparison between any contents of the memory of the network device after completion of the data erasure procedure and expected contents of the memory of the network device after completion of the data erasure procedure which are indicative of a successful erasure of the memory of the network device;
wherein the network device has an Ethernet port for communication with a Wide Area Network (WAN) and the method comprises establishing a connection with the network device via the Ethernet port according to a WAN Management Protocol, for example wherein the WAN Management Protocol comprises a TR-069 CPE WAN Management Protocol; and
further comprising sending a FactoryReset Remote Procedure Call (RPC) message to the network device to reset the network device to its factory default state and cause the memory of the network device to be erased and/or sending a ScheduleDownload or a Download message to the network device to cause the network device to download a firmware update from a designated location and to apply the firmware update in order to overwrite existing firmware of the network device.

19. A method as claimed in claim 18, comprising:
requesting IP address data and/or MAC address data from the memory of the network device after completion of the data erasure procedure or accessing a pre-defined portion of the memory of the network device used to store IP address data and/or MAC address data after completion of the data erasure procedure; and determining a successful outcome based at least in part on:
  verifying that the received response from the network device does not include any IP address data and/or any MAC address data after completion of the data erasure procedure; or
  verifying that the pre-defined portion of the memory of the network device used to store IP address data and/or MAC address data does not include any IP address data and/or any MAC address data after completion of the data erasure procedure.

20. A method as claimed in claim 18, comprising:
requesting initial data from the memory of the network device before commencing the data erasure procedure or accessing the memory of the network device before commencing the data erasure procedure;
determining the outcome of the data erasure procedure based at least in part on:
  the results of a comparison between an initial response received from the network device in reply to the request for initial data and the received response from the network device after completion of the data erasure procedure; or
  the results of a comparison between any initial contents of the memory of the network device before commencing the data erasure procedure and any contents of the memory of the network device after completion of the data erasure procedure; and
the method further comprising determining that the outcome of the data erasure procedure is successful based at least in part on verifying that a routing table of the network device has been cleared of any IP addresses and/or cleared of any MAC addresses.

\* \* \* \* \*